US012571543B2

(12) United States Patent
Kapsaskis

(10) Patent No.: US 12,571,543 B2
(45) Date of Patent: Mar. 10, 2026

(54) STOVE BURNER SHIELD FOR A RECREATIONAL VEHICLE

(71) Applicant: SBC Holdings LLC, South Bend, IN (US)

(72) Inventor: Christopher Kapsaskis, Colts Neck, NJ (US)

(73) Assignee: SBC Holdings LLC, South Bend, IN (US)

( * ) Notice: Subject to any disclaimer, the term of this patent is extended or adjusted under 35 U.S.C. 154(b) by 354 days.

(21) Appl. No.: 18/324,279

(22) Filed: May 26, 2023

(65) Prior Publication Data

US 2024/0392975 A1    Nov. 28, 2024

(51) Int. Cl.
| | |
|---|---|
| *F24C 15/36* | (2006.01) |
| *B60P 3/32* | (2006.01) |
| *F24C 3/10* | (2006.01) |

(52) U.S. Cl.
CPC ................ *F24C 15/36* (2013.01); *B60P 3/32* (2013.01); *F24C 3/103* (2013.01)

(58) Field of Classification Search
CPC ............. F24C 15/36; F24C 3/103; B60P 3/32
USPC ........................................ 126/42, 39 R, 39 E
See application file for complete search history.

(56) References Cited

U.S. PATENT DOCUMENTS 6,692,062 B1 *    2/2004    Woodard .................. B60P 3/32
                                                                  296/25
2011/0290231 A1 *   12/2011   Padgett ................... F23D 14/06
                                                                  126/215

* cited by examiner

*Primary Examiner* — Vivek K Shirsat
(74) *Attorney, Agent, or Firm* — FLYNN THIEL, P.C.

(57) ABSTRACT

A recreational vehicle having a kitchen area with a stove. The stove includes a stove top surface with an opening in the stove top surface. A burner assembly extends through the opening in the stove top surface. The burner assembly includes a flammable gas supply post and a sparker configured to ignite flammable gas exiting the flammable gas supply post. A gap area extends between a peripheral edge of the opening and an outer periphery of the burner assembly. A metal burner shield is positioned to cover the gap area, with the metal burner shield including a hole for accepting the at least one burner assembly through the hole. The metal burner shield prevents viewing of internal components of the stove through the gap area and reflects heat from the at least one burner assembly upward.

13 Claims, 5 Drawing Sheets

STOVE BURNER SHIELD FOR A RECREATIONAL VEHICLE

FIELD OF THE INVENTION

The present invention relates to a stove for a recreational vehicle, and in particular to a stove burner shield for a recreational vehicle.

BACKGROUND OF THE INVENTION

Recreational vehicles can have kitchens therein. A recreational vehicle is a motor vehicle or trailer that includes living quarters designed for accommodation. Types of recreational vehicles include motorhomes, campervans, coaches, caravans (also known as travel trailers and camper trailers), fifth-wheel trailers, popup campers, and truck campers. This list is not exhaustive. Recreational vehicles can include a kitchen that has a stove.

It is desirable to devise a more efficient and aesthetically pleasing stove.

SUMMARY OF THE INVENTION

The present invention, according to one aspect, is directed to a recreational vehicle comprising a movable body having at least one wheel for moving the recreational vehicle. The movable body includes a kitchen area having a stove. The stove includes a stove top surface with at least one opening in the stove top surface. The recreational vehicle includes at least one burner assembly. Each at least one burner assembly extends through one of the at least one opening in the stove top surface. Each at least one burner assembly includes a flammable gas supply post and a sparker configured to ignite flammable gas exiting the flammable gas supply post. A gap area extends between a peripheral edge of each of the at least one opening and an outer periphery of the at least one burner assembly. A metal burner shield is positioned to cover the gap area. The metal burner shield includes a hole for accepting the at least one burner assembly through the hole. The metal burner shield prevents viewing of internal components of the stove through the gap area and reflects heat from the at least one burner assembly upward.

Another aspect of the present invention is to provide a stove for a recreational vehicle. The stove comprises a stove top surface with a circular opening in the stove top surface and a burner assembly extending through the circular opening in the stove top surface. The burner assembly includes a flammable gas supply post and a sparker located adjacent to the flammable gas supply post and configured to ignite flammable gas exiting the flammable gas supply post. A gap area extends between a peripheral edge of the circular opening and an outer periphery of the burner assembly. A metal burner shield is positioned to cover the gap area, with the metal burner shield including a hole for accepting the burner assembly through the hole. The metal burner shield prevents viewing of internal components of the stove through the gap area and reflects heat from the assembly upward.

According to yet another aspect of the present invention, a method of adding a burner shield to a stove of a recreational vehicle is provided. The method comprises providing the recreational vehicle with a kitchen area having a stove, providing the stove with a stove top surface having a circular opening in the stove top surface and a burner assembly extending through the circular opening in the stove top surface, with the burner assembly including a flammable gas supply post and a sparker configured to ignite flammable gas exiting the flammable gas supply post, providing a gap area extending between a peripheral edge of the circular opening and an outer periphery of the burner assembly, providing a metal burner shield having a hole, inserting the burner assembly through the hole in the metal burner shield, and covering the gap area with the metal burner shield to prevent viewing of internal components of the stove through the gap area.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

The specific devices and processes illustrated in the attached drawings and described in the following specification are simply exemplary embodiments of the inventive concepts. Hence, specific dimensions and other physical characteristics relating to the embodiments disclosed herein are not to be considered as limiting.

DETAILED DESCRIPTION

For purposes of description herein, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
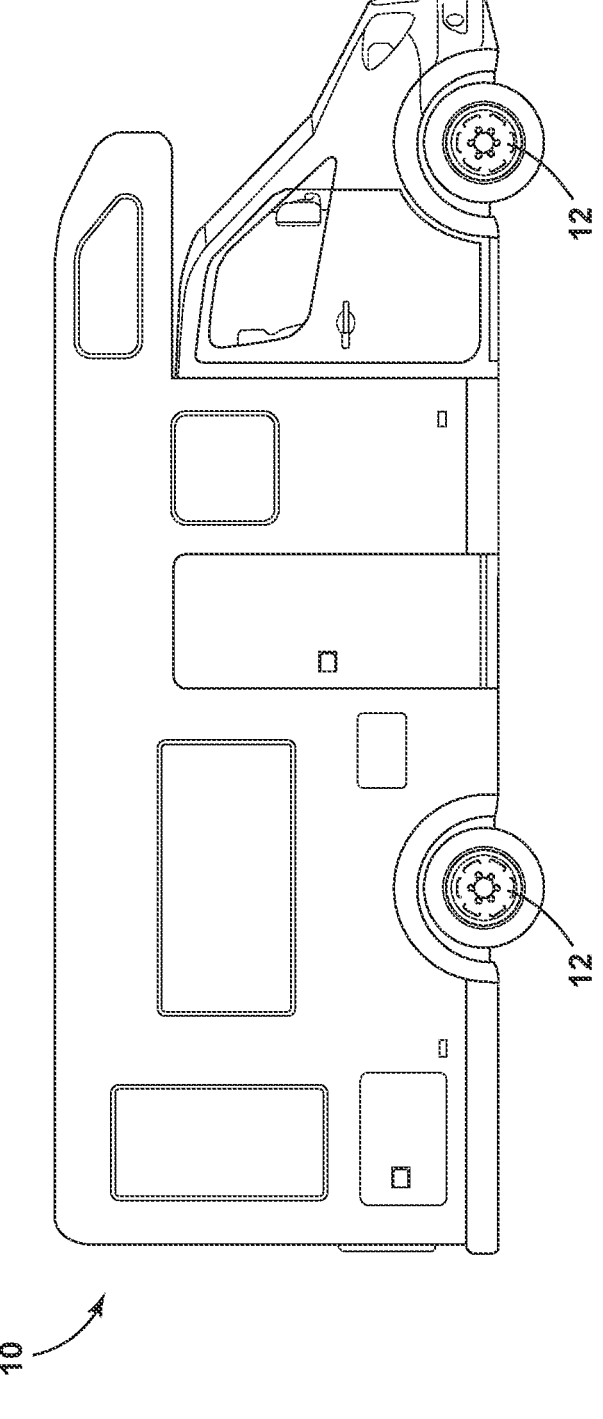
FIG. 1 is a side schematic view of an example recreational vehicle.
Figure 2:
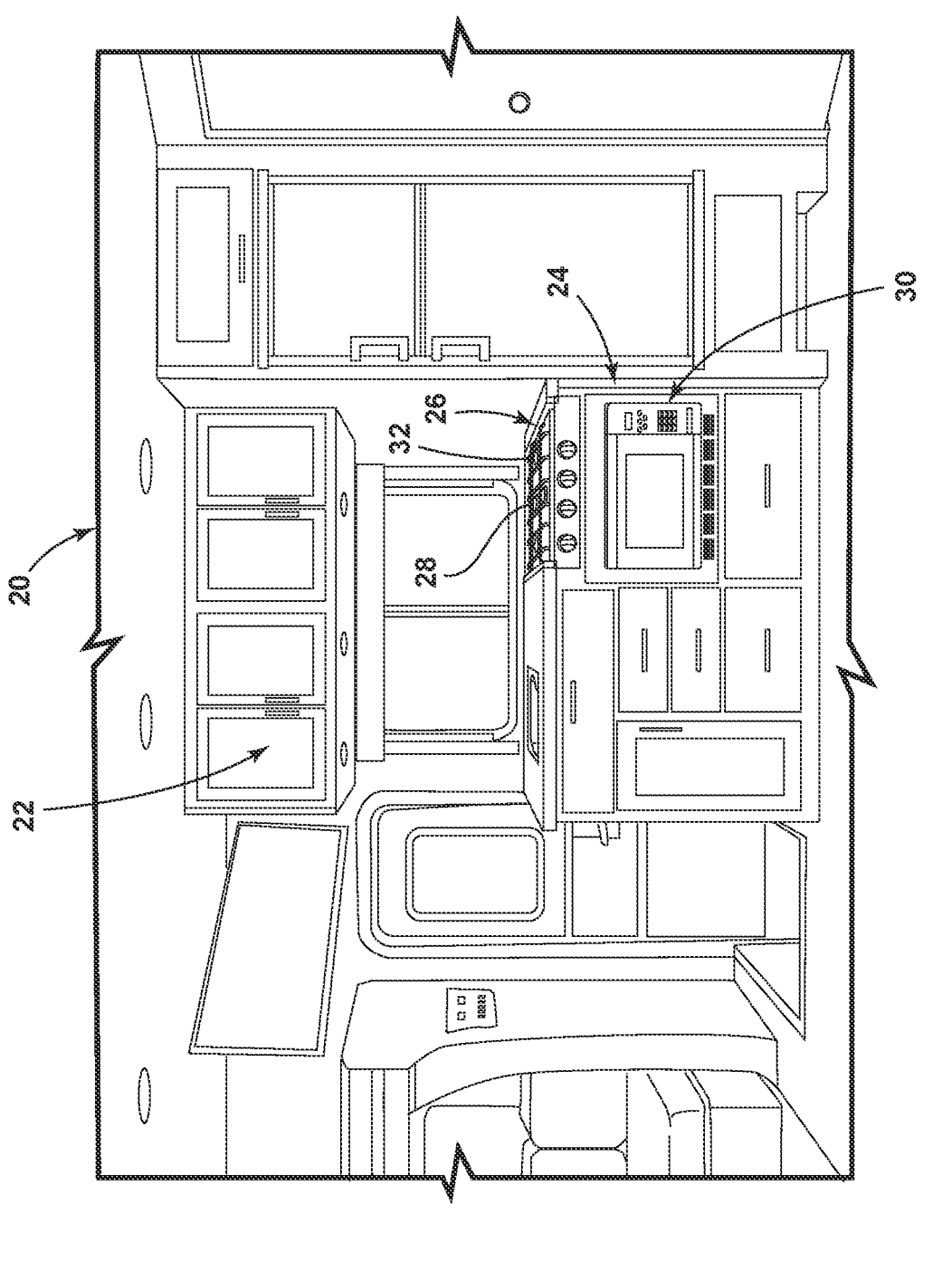
FIG. 2 is an interior view of the recreational vehicle, with the recreational vehicle including a kitchen having a stove.

The reference number 10 (FIG. 1) generally designates a recreational vehicle. The recreational vehicle 10 is a motor vehicle or trailer that includes living quarters designed for accommodation. Types of recreational vehicles 10 include motorhomes, campervans, coaches, caravans (also known as travel trailers and camper trailers), fifth-wheel trailers, popup campers, and truck campers. This list is not exhaustive. The example of the recreational vehicle 10 as shown in FIG. 1 is a motorhome that is self-propelled via wheels 12 (with at least some of the wheels 12 being driven to move the motorhome). An interior 20 of the recreational vehicle 10 is shown in FIG. 2. The interior 20 can include a kitchen 22 that has a stove 24. The stove 24 includes a stove top 26 with at least one, and typically several, burner areas 28. Each of the burner areas 28 includes a burner assembly 50 that is configured to supply heat to an item positioned above the burner assembly 50, with the item typically placed on a grate 32 positioned over the stove top 26. The burner areas 28 and burner assembly 50 of an embodiment of the present invention are discussed in more detail below. The stove 24 can also include an oven 30.

Figures 3, 4:
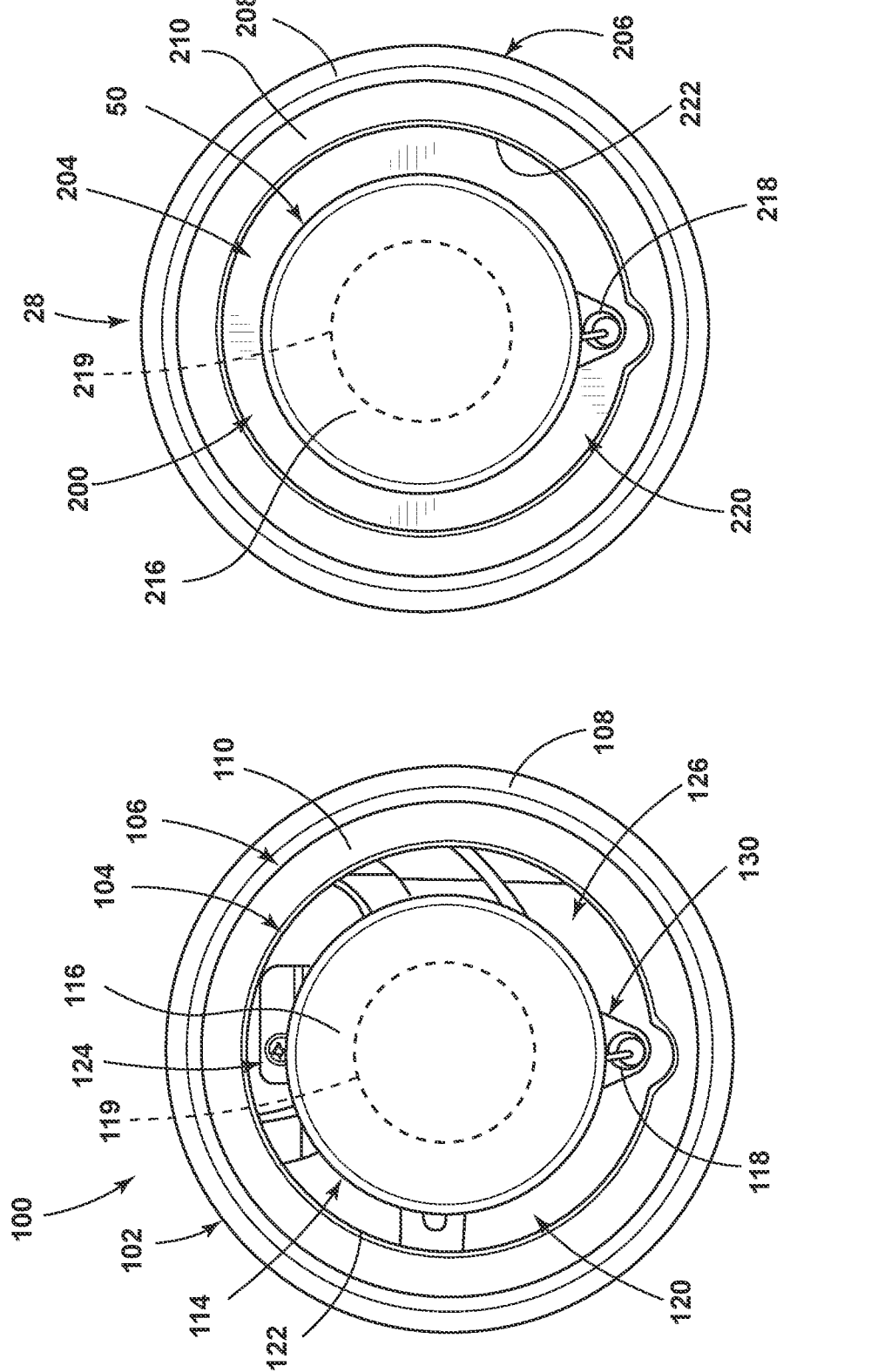
FIG. 3 is a top view of a burner area of a prior art stove.
FIG. 4 is a top view of a burner area of a stove according to the present invention.

FIG. 3 illustrates a prior art burner area 100. As shown in FIG. 3, the prior art burner area 100 includes a portion of a stove top 102 that defines a circular opening 104. The prior art burner area 100 includes a surrounding stove top portion 106 of the stove top 102 that surrounds the circular opening 104. The surrounding stove top portion 106 can include a circular ridge 108 and a depressed circular area 110 that surrounds the circular opening 104, although some prior surrounding stove top portions 106 only include the circular ridge 108 or the depressed circular area 110 or can include multiple circular ridges 108 and/or depressed circular areas 110. As illustrated in FIG. 3, a burner assembly 114 protrudes through the circular opening 104. As is well known to those skilled in the art, the prior art burner assembly 114 includes a flammable gas supply post 119 with a plurality of openings and/or slots for exit of flammable gas, a top plate 116 (typically magnetically connected to a top of the flammable gas supply post 119), and a sparker 118 located adjacent to the flammable gas supply post 119. The sparker 118 selectively provides a spark to ignite the flammable gas exiting the flammable gas supply post 119.

As shown in FIG. 3, the flammable gas supply post 119 and the sparker 118 define a structure 130 with a tear drop shape extending through the circular opening 104, with the tear drop shape having a globular form at one side with the flammable gas supply post 119 and tapering to a point having the sparker 118. The prior art burner area 100 includes an open area 120 located between the burner assembly 114 and an inner periphery 122 of the circular opening 104. The open area 120 provides an opening into an interior 126 of the prior art stove such that interior components 124 (such as wires, screws, pipes, etc.) of the prior art stove can be viewed.

Figure 5:
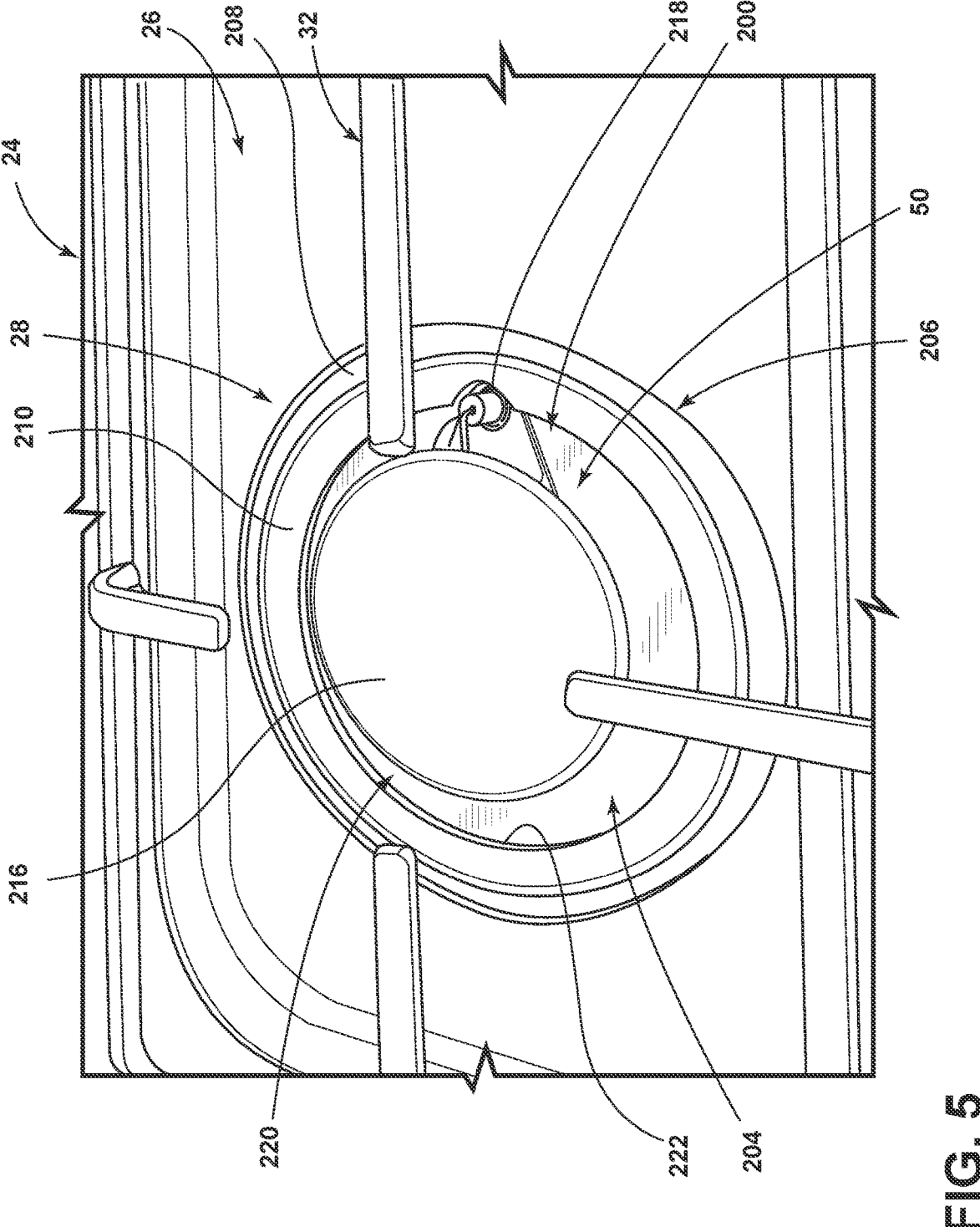
FIG. 5 is a perspective partial top view of the stove according to the present invention.

FIGS. 4 and 5 illustrate the burner area 28 of an embodiment of the present invention. The burner area 28 of an embodiment of the present invention includes all of the elements of the prior art burner area 100, along with a burner shield 200 of the present invention. Therefore, the burner area 28 of an embodiment of the present invention includes a portion of the stove top 26 that defines a circular opening 204. The burner area 28 includes a surrounding stove top portion 206 of the stove top 26 that surrounds the circular opening 204. The surrounding stove top portion 206 can include a circular ridge 208 and a depressed circular area 210 that surrounds the circular opening 204, although it is contemplated that the surrounding stove top portions 206 only include the circular ridge 208 or the depressed circular area 210 or can include multiple circular ridges 208 and/or depressed circular areas 210. As illustrated in FIGS. 4-5, the burner assembly 50 protrudes through the circular opening 204. As outlined above, the burner assembly 50 includes a flammable gas supply post 219 with a plurality of openings and/or slots for exit of flammable gas, a top plate 216 (typically magnetically connected to a top of the flammable gas supply post 219), and a sparker 218 located adjacent to the flammable gas supply post 219. The sparker 218 selectively provides a spark to ignite the flammable gas exiting the flammable gas supply post 219.

In the illustrated embodiment, the flammable gas supply post 219 and the sparker 218 define a structure 230 with a tear drop shape extending through the circular opening 204, with the tear drop shape having a globular form at one side with the flammable gas supply post 219 and tapering to a point having the sparker 218. While the burner area 28 still includes an open area 220 located between the burner assembly 50 and an inner periphery 222 of the circular opening 204, the burner shield 200 is located directly under the surrounding stove top portion 206 of the stove top 26 that surrounds the circular opening 204.

Figure 6:
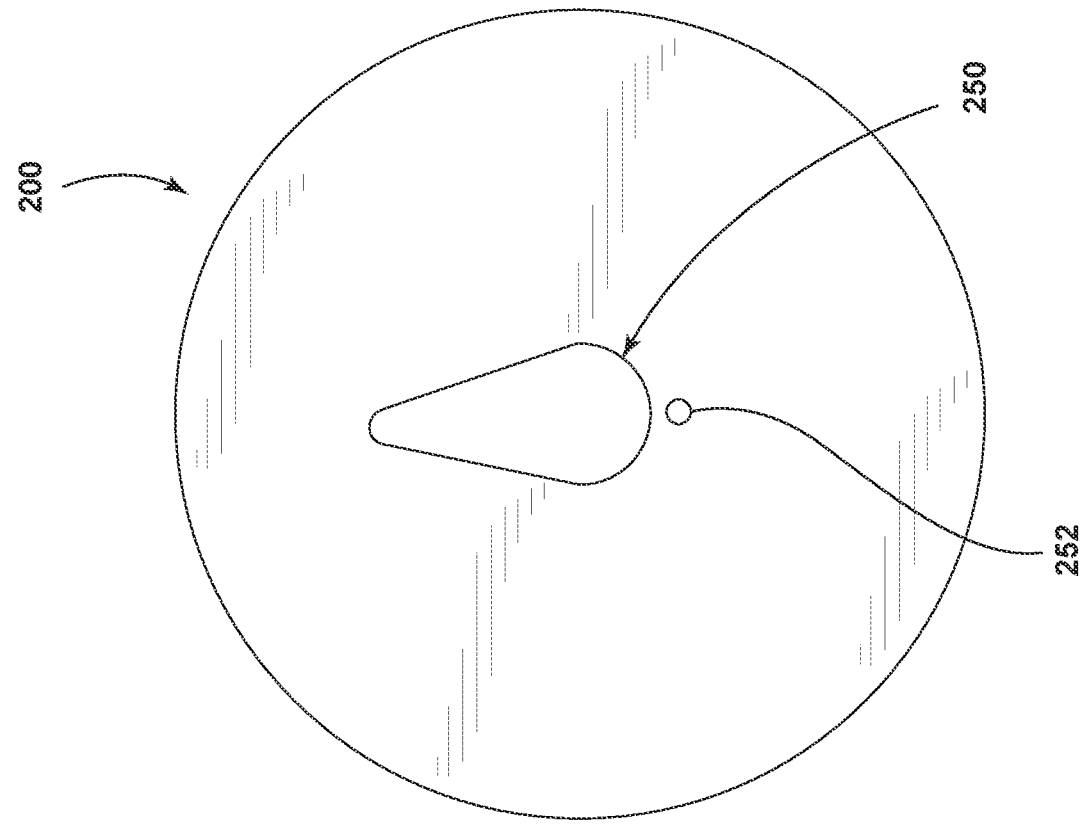
FIG. 6 is a top view of a stove burner shield of the present invention.

The illustrated burner shield 200 provides a more pleasing aesthetic overall appearance for the stove 24 and makes the stove 24 more efficient. As shown in FIGS. 4-5, the burner shield 200 prevents viewing of the interior of the stove 24, thereby providing a more pleasing aesthetic overall appearance for the stove 24. Moreover, the burner shield 200 prevents the flame from the burner assembly 50 from being suctioned through the open area 220 and reflects heat back upward to more efficiently heat any item positioned above the burner assembly 50 (e.g., on the grate 32). As shown in FIG. 6, the burner shield 200 is formed out of sheet metal (e.g., steel, brass, bronze, aluminum, etc.) and includes an interior area with a tear drop shaped opening 250 for accommodating the flammable gas supply post 219 and sparker 218 therethrough. The burner shield 200 can also include at least one fastener opening 252 located at any area for accepting a fastener therethrough for connecting the burner shield 200 to the stove 24. It is contemplated that the burner shield 200 could be connected to the stove 24 in any manner (e.g., at least one fastener as described above and/or through a suitable adhesive). An outer periphery of the burner shield 200 can have any shape (e.g., a circular shape as shown and conforming to an area surrounding the circular opening 204 or any other shape).

The illustrated burner shield 200 can be positioned in the stove 24 when the stove 24 is sold or can be retrofitted onto the prior art stove by opening the stove. For example, the prior art stove top 102 cab be rotated about a hinge to allow access to all objects under the stove top 102 and the burner shield 200 can be affixed to a bottom surface of the prior art stove top.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A recreational vehicle comprising:
   a movable body having at least one wheel for moving the recreational vehicle;
   the movable body including a kitchen area having a stove;
   the stove including a stove top surface with at least one opening in the stove top surface;
   at least one burner assembly, each at least one burner assembly extending through one of the at least one opening in the stove top surface, each at least one burner assembly including a flammable gas supply post and a sparker configured to ignite flammable gas exiting the flammable gas supply post;
   a gap area extending between a peripheral edge of each of the at least one opening and an outer periphery of the at least one burner assembly; and
   a metal burner shield positioned to cover the gap area, the metal burner shield including a hole for accepting the at least one burner assembly through the hole;
   wherein the metal burner shield prevents viewing of internal components of the stove through the gap area and reflects heat from the at least one burner assembly upward; and
   wherein the hole has a tear drop shape including a globular form at one side with the flammable gas supply post extending therethrough and tapering to a point having the sparker extending therethrough.

2. The recreational vehicle of claim 1, wherein:
the at least one opening is circular.

3. The recreational vehicle of claim 1, wherein:
the at least one burner assembly includes a top plate magnetically coupled to a top of the flammable gas supply post.

4. The recreational vehicle of claim 1, wherein:
the stove includes a grate located above the at least one burner assembly.

5. The recreational vehicle of claim 1, wherein:
the metal burner shield further includes at least one fastener opening for accepting a fastener therethrough for connecting the metal burner shield to the stove.

6. A stove for a recreational vehicle, the stove comprising:
a stove top surface with a circular opening in the stove top surface;
a burner assembly extending through the circular opening in the stove top surface, the burner assembly including a flammable gas supply post and a sparker located adjacent to the flammable gas supply post and configured to ignite flammable gas exiting the flammable gas supply post;
a gap area extending between a peripheral edge of the circular opening and an outer periphery of the burner assembly; and
a metal burner shield positioned to cover the gap area, the metal burner shield including a hole for accepting the burner assembly through the hole;
wherein the metal burner shield prevents viewing of internal components of the stove through the gap area and reflects heat from the burner assembly upward; and
wherein the burner assembly includes a top plate magnetically coupled to a top of the flammable gas supply post.

7. The stove of claim 6, wherein:
the hole has a tear drop shape including a globular form at one side with the flammable gas supply post extending therethrough and tapering to a point having the sparker extending therethrough.

8. The stove of claim 6, wherein:
the stove includes a grate located above the burner assembly.

9. The stove of claim 6, wherein:
the metal burner shield further includes a fastener opening for accepting a fastener therethrough for connecting the metal burner shield to the stove.

10. A method of adding a burner shield to a stove of a recreational vehicle, the method comprising:
providing the recreational vehicle with a kitchen area having a stove;
providing the stove with a stove top surface having a circular opening in the stove top surface and a burner assembly extending through the circular opening in the stove top surface, with the burner assembly including a flammable gas supply post and a sparker configured to ignite flammable gas exiting the flammable gas supply post;
providing a gap area extending between a peripheral edge of the circular opening and an outer periphery of the burner assembly;
providing a metal burner shield having a hole;
inserting the burner assembly through the hole in the metal burner shield; and
covering the gap area with the metal burner shield to prevent viewing of internal components of the stove through the gap area;
wherein the burner assembly includes a top plate magnetically coupled to a top of the flammable gas supply post.

11. The method of claim 10, wherein:
the hole has a tear drop shape including a globular form at one side with the flammable gas supply post extending therethrough and tapering to a point having the sparker extending therethrough.

12. The method of claim 10, wherein:
the stove includes a grate located above the burner assembly.

13. The method of claim 10, wherein:
the burner shield further includes a fastener opening for accepting a fastener therethrough for connecting the burner shield to the stove.

* * * * *